(12) United States Patent
Rothmuller

(10) Patent No.: US 7,636,733 B1
(45) Date of Patent: Dec. 22, 2009

(54) TIME-BASED IMAGE MANAGEMENT

(75) Inventor: Kenneth Rothmuller, Santa Rosa, CA (US)

(73) Assignee: Adobe Systems Incorporated, San Jose, CA (US)

( * ) Notice: Subject to any disclaimer, the term of this patent is extended or adjusted under 35 U.S.C. 154(b) by 432 days.

(21) Appl. No.: 10/678,606

(22) Filed: Oct. 3, 2003

(51) Int. Cl.
 *G06F 17/00* (2006.01)
(52) U.S. Cl. ............... 707/104.1; 707/3; 707/6; 707/5; 705/9; 705/10; 715/259; 715/759
(58) Field of Classification Search ............ 707/3, 707/100, 10, 1, 104.1, 7, 6, 5; 705/9, 10; 715/259, 759
See application file for complete search history.

(56) References Cited

U.S. PATENT DOCUMENTS

| | | | |
|---|---|---|---|
| 4,888,692 A * | 12/1989 | Gupta et al. ............... | 700/96 |
| 5,214,622 A * | 5/1993 | Nemoto et al. ............. | 368/10 |
| 5,241,671 A | 8/1993 | Reed et al. | |
| 5,260,868 A * | 11/1993 | Gupta et al. ............... | 700/100 |
| 5,491,626 A | 2/1996 | Williams et al. | |
| 5,557,747 A | 9/1996 | Rogers et al. | |
| 5,559,942 A * | 9/1996 | Gough et al. ............... | 715/802 |
| 5,644,766 A | 7/1997 | Coy et al. | |
| 5,664,063 A * | 9/1997 | Johnson et al. ............. | 358/1.1 |
| 5,668,966 A | 9/1997 | Ono et al. | |
| 5,692,175 A | 11/1997 | Davies et al. | |
| 5,706,457 A | 1/1998 | Dwyer et al. | |
| 5,734,888 A | 3/1998 | Li et al. | |
| 5,751,286 A | 5/1998 | Barber et al. | |
| 5,761,655 A | 6/1998 | Hoffman | |
| 5,787,412 A | 7/1998 | Bosch et al. | |
| 5,796,945 A * | 8/1998 | Tarabella ................... | 709/219 |
| 5,813,014 A | 9/1998 | Gustman | |
| 5,832,495 A | 11/1998 | Gustman | |
| 5,842,218 A | 11/1998 | Robinson | |
| 5,844,572 A | 12/1998 | Schott | |
| 5,884,298 A | 3/1999 | Smith et al. | |
| 5,898,431 A * | 4/1999 | Webster et al. ............. | 715/841 |
| 5,907,324 A * | 5/1999 | Larson et al. .............. | 715/753 |
| 5,956,730 A | 9/1999 | Burroughs et al. | |
| 6,017,157 A | 1/2000 | Garfinkle et al. | |
| 6,085,205 A * | 7/2000 | Peairs et al. ............... | 715/209 |

(Continued)

FOREIGN PATENT DOCUMENTS

JP   08030763   2/1996

OTHER PUBLICATIONS

"Adobe Acquires Fotiva", Silicon Valley / San Jose Business Journal, Dec. 5, 2001, p. 1 (downloaded from: sanjose.bizjournals.com/sanjose/stories/2001/12/03/daily29. html?t=printable).

(Continued)

*Primary Examiner*—Isaac M Woo
*Assistant Examiner*—Leon Harper
(74) *Attorney, Agent, or Firm*—Fish & Richardson P.C.

(57) ABSTRACT

Methods and apparatus for digital image management. In general, in one aspect, a method for digital image management includes receiving a digital image associated with a specific time. The method includes receiving a data unit associated with a time interval. The method includes associating the data unit with the digital image when the time interval associated with the data unit includes the specific time.

45 Claims, 13 Drawing Sheets

U.S. PATENT DOCUMENTS

| | | | |
|---|---|---|---|
| 6,094,657 A | 7/2000 | Hailpern et al. | |
| 6,148,260 A | 11/2000 | Musk et al. | |
| 6,148,354 A | 11/2000 | Ban et al. | |
| 6,195,651 B1* | 2/2001 | Handel et al. | 707/2 |
| 6,199,099 B1* | 3/2001 | Gershman et al. | 709/203 |
| 6,202,061 B1 | 3/2001 | Khosla et al. | |
| 6,240,423 B1 | 5/2001 | Hirata | |
| 6,246,410 B1 | 6/2001 | Bergeron et al. | |
| 6,370,541 B1 | 4/2002 | Chou et al. | |
| 6,396,963 B2 | 5/2002 | Shaffer et al. | |
| 6,401,085 B1* | 6/2002 | Gershman et al. | 707/4 |
| 6,408,301 B1 | 6/2002 | Patton et al. | |
| 6,425,017 B1 | 7/2002 | Dievendorff et al. | |
| 6,434,546 B1 | 8/2002 | Williamowski et al. | |
| 6,442,527 B1* | 8/2002 | Worthington | 705/8 |
| 6,466,940 B1 | 10/2002 | Mills | |
| 6,504,571 B1 | 1/2003 | Narayanaswami et al. | |
| 6,581,102 B1 | 6/2003 | Amini et al. | |
| 6,587,668 B1* | 7/2003 | Miller et al. | 434/350 |
| 6,587,856 B1 | 7/2003 | Srinivasan et al. | |
| 6,598,046 B1 | 7/2003 | Goldberg et al. | |
| 6,628,899 B1 | 9/2003 | Kito | |
| 6,629,104 B1 | 9/2003 | Parulski et al. | |
| 6,738,155 B1 | 5/2004 | Rosenlund et al. | |
| 6,760,884 B1 | 7/2004 | Vertelney et al. | |
| 6,845,370 B2* | 1/2005 | Burkey et al. | 707/3 |
| 6,904,427 B1 | 6/2005 | Hagiwara et al. | |
| 6,947,959 B1 | 9/2005 | Gill | |
| 6,957,205 B1* | 10/2005 | Liongosari et al. | 706/45 |
| 6,993,723 B1* | 1/2006 | Danielsen et al. | 715/751 |
| 7,017,162 B2* | 3/2006 | Smith et al. | 719/328 |
| 7,020,686 B2* | 3/2006 | Banatwala | 709/204 |
| 7,028,262 B2* | 4/2006 | Estrada et al. | 715/751 |
| 7,034,691 B1* | 4/2006 | Rapaport et al. | 340/573.1 |
| 7,069,259 B2* | 6/2006 | Horvitz et al. | 706/25 |
| 7,076,503 B2* | 7/2006 | Platt et al. | 707/103 R |
| 7,076,504 B1* | 7/2006 | Handel et al. | 707/104.1 |
| 7,082,430 B1* | 7/2006 | Danielsen et al. | 707/10 |
| 7,103,559 B2* | 9/2006 | Worthington | 705/8 |
| 7,296,032 B1 | 11/2007 | Beddow | |
| 7,298,520 B2* | 11/2007 | Ohkubo et al. | 358/1.18 |
| 7,363,590 B2* | 4/2008 | Kerr et al. | 715/759 |
| 7,415,662 B2 | 8/2008 | Rothmuller et al. | |
| 7,472,135 B2* | 12/2008 | Huuskonen | 707/104.1 |
| 2002/0087546 A1 | 7/2002 | Slater et al. | |
| 2002/0097259 A1* | 7/2002 | Marshall et al. | 345/738 |
| 2002/0140730 A1* | 10/2002 | Linsey et al. | 345/751 |
| 2002/0140820 A1* | 10/2002 | Borden, IV | 348/207.99 |
| 2002/0149618 A1* | 10/2002 | Estrada et al. | 345/760 |
| 2002/0165753 A1* | 11/2002 | Worthington | 705/8 |
| 2002/0170040 A1* | 11/2002 | Idan | 717/141 |
| 2003/0084065 A1* | 5/2003 | Lin et al. | 707/104.1 |
| 2003/0154212 A1* | 8/2003 | Schirmer et al. | 707/103 R |
| 2003/0167310 A1* | 9/2003 | Moody et al. | 709/206 |
| 2003/0200192 A1* | 10/2003 | Bell et al. | 707/1 |
| 2004/0002932 A1* | 1/2004 | Horvitz et al. | 706/46 |
| 2004/0078372 A1* | 4/2004 | Huuskonen | 707/10 |
| 2004/0078389 A1* | 4/2004 | Hamilton | 707/104.1 |
| 2005/0044066 A1* | 2/2005 | Hooper et al. | 707/3 |
| 2005/0044529 A1* | 2/2005 | Simons et al. | 717/120 |
| 2005/0050043 A1* | 3/2005 | Pyhalammi et al. | 707/6 |
| 2005/0057584 A1* | 3/2005 | Gruen et al. | 345/752 |
| 2005/0182752 A1 | 8/2005 | Rojer | |
| 2005/0207645 A1 | 9/2005 | Nishimura et al. | |
| 2008/0306921 A1 | 12/2008 | Rothmuller et al. | |

OTHER PUBLICATIONS

"Adobe Acquires Technology to Create Complete Image Management and Sharing Solution", Adobe Press Release, Dec. 5, 2001, pp. 1-3 (downloaded from: www.adobe.com/aboutadobe/pressroom/pressreleases/200112/20011205fotiva.html).

Ahlberg, Christopher, et al., "Visual Information Seeking Using the FilmFinder", CHI '94, Boston. MA, Apr. 1994, pp. 433 and 484 (2 pages).

Balabanovic, Marko, et al., "Storytelling with Digital Photographs", CHI '2000, The Hague, Amersterdam. Apr. 1-6, 2000, CHI Letters, vol. 2 issue 1, pp. 564-571 [ACM 1-58113-036-8/98/0008].

Bell Gordon, "A Personal Digital Store", Communications of the ACM, vol. 44 No. 1, pp. 86-91. 2001.

Cha, Guang-Ho, et al., "Object-Oriented Retrieval Mechanism for Semistructured Image Collections", Multimedia '98, Bristol, UK, Sep. 1998, pp. 323-332 [ACM 1-58113-036-8/98/0008] (plus citation page).

Christel, Michael, "Visual Digests for News Video Libraries", ACM Multimedia '99, Orlando, FL, Oct. 1999, pp. 303-311.

Christenssson, et al. "Universal Plug and Play Connects Smart Devices", as archived by the Wayback Machine™ on Oct. 23, 1999 pp. 1-22 (Note: the May 27, 2004 on the page refers to the date of the download, not the publication date).

Goland, et al. "Simple Service Discovery Protocol/1.0 Operating Without an Arbiter", Oct. 28, 1999, published by the Internet Engineering Task Force (IETF), 17 sheets.

Hill, Linda L. et al., "Collection Metadata Solutions for Digital Library Applications," Journal of the American Society for Information Science, vol. 50, No. 13, © 1999, pp. 1169-1181.

Hirata, Kyoji, et al., "Facilitating Object-Based Navigation Through Multimedia Databased," Theory and Practice of Object Systems, vol. 4, No. 4, © 1998, pp. 261-283.

"Introducing Fotiva, Inc., NEA-Backed New Consumer Digital Software and Services Company; Led by Former Intuit SVP, Company Plans On Launching Mass-Appeal Digital Solutions", Business Wire, Oct. 8, 2001, pp. 1-2 (downloaded from: www.findarticles.com/articles/mi_m0EIN/is_2001_Oct_8/ai_78958587/print).

Kuchinsky, Allan, et al., "FotoFile: A Consumer Multimedia Organization and Retrieval System", CHI '99, Pittsburgh, PA, May 15-20, 1999, pp. 496-503.

Li, Wen-Syan, et al., "Brokerage Architecture for Stock Photo Industry," RIDE 1997, Apr. 7-8, 1997, pp. 91-100.

Loui, Alexander C., et al., "A Software System for Automatic Albuming of Consumer Pictures", Multimedia '99 (Part 2), Orlando, FL; Oct. 1999, pp. 159-162 [ACM 1-58113-239-5/99/0010].

Mills, Timothy J., et al., "Managing Photos with AT&T Shoebox", S1G1R 2000, Athens, Greece, Jul. 2000, p. 390 [ACM 1-58113-226-3/00/0007] (plus citation page).

Mills, Timothy J., et al., "Shoebox: A Digital Photo Management System", Technical Report 2000.10, AT&T Laboratories Cambridge, (c) 2000, pp. 1-8.

North, Chris, et al., "Snap-Together Visualization: A User Interface for Coordinating Visualizations via Relational Schemata", AVI 2000, Palermo, Italy, May 2000, pp. 128-135.

Smith, Brian K., et al., "Inquiry with Imagery: Historical Archive Retrieval with Digital Cameras", Multimedia '99, Orlando, FL, Oct. 1999, pp. 405-408 [ACM 1-58113-151-8/99/0010].

Toyama, Kentaro, et al., "Geographic Location Tags on Digital Images", MM '03, Berkeley, CA, Nov. 2-8, 2003, pp. 156-166 [ACM 1-58113-722-2/03/0011].

Web page, http:///www.upnp.org as archived by the Wayback Machine ™ on Oct. 23, 1999, 7 sheets.

Ahlberg: "Spotfire: An Information Exploration Environment", Dec. 1, 1996; IVEE Development AB, Chalmers University of Technology & SSKKII, Sweden.

Beaza-Yates, R. and Ribeiro-Neto, B.: "Modern Information Retrieval"; Addison Wesley, USA XP002210866; ISBN: 0-201-39829-X; Chapter 10: "User Interfaces and Visualization". 1999.

Hearst: "Next Generation Web Search: Setting our Sites"; Sep. 2000; Bulletin of the Technical Committee on Data Engineering, School of Information Management and Systems, University of California at Berkeley, CA.

Quinn: "PCT Invitation to Pay Additional Fees with Partial International Search Report"; Sep. 19, 2002; PCT/US02/01530.

Steven F. Roth, et al.: "Towards an Information Visualization Workspace: Combining Multiple Means of Expression"; 1997; Human-Computer Interaction Journal, vol. 12, No. 1-2, Lawrence Erlbaum Associates.

Shneiderman, Ben: "Designing the user interface: Strategies for effective human-computer interaction", 1959; Addison Wesley, USA XP 002210867; ISBN: 0-201-69497-2; Chapter 15: "Information Search and Visualization".

"Standard C++ Bible," Al Stevens and Clayton Walnum, IDG Books Worldwide, Inc. Copyright ©, 2000, pp. 324-327, 332-334, 353-354, 470-478, 589-598, 691-712.

"Read Me for iPhoto 2.0 for Mac OS X" [online], Jan. 30, 2003, Retrieved from Apple.Com Worldwide using Internet http://does.info.apple.com/article.html?artnum=120188.

* cited by examiner

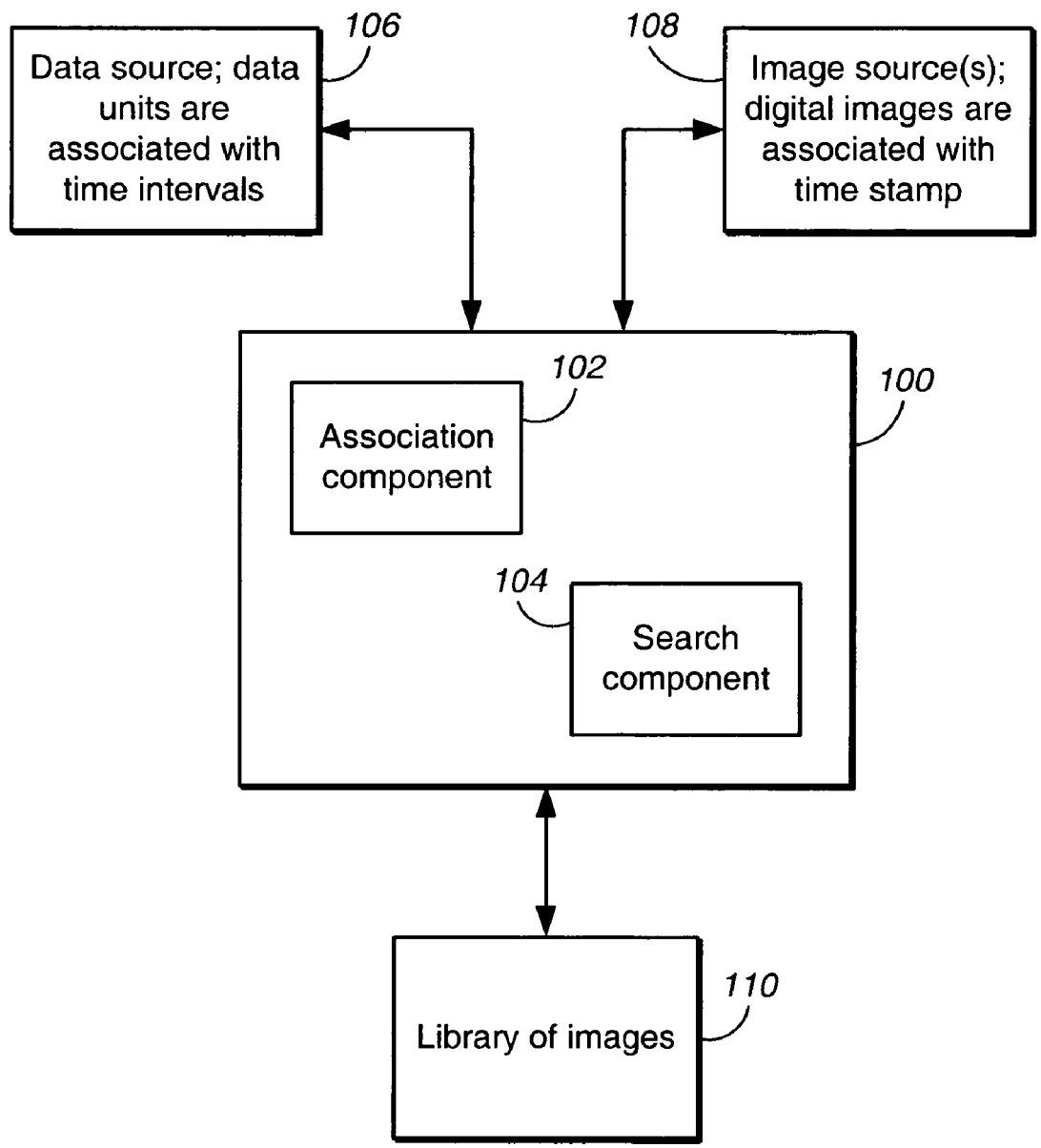
FIG._1

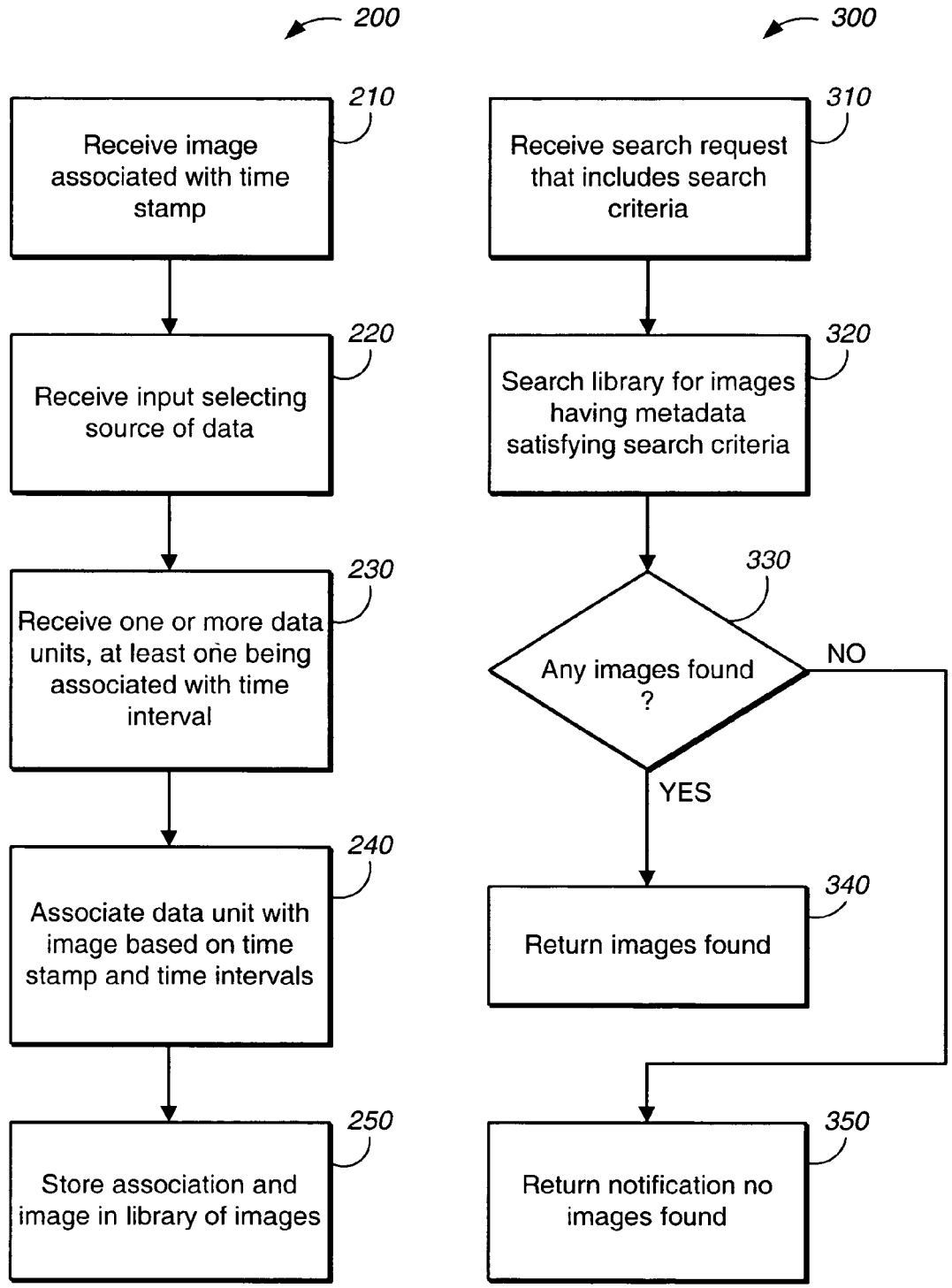

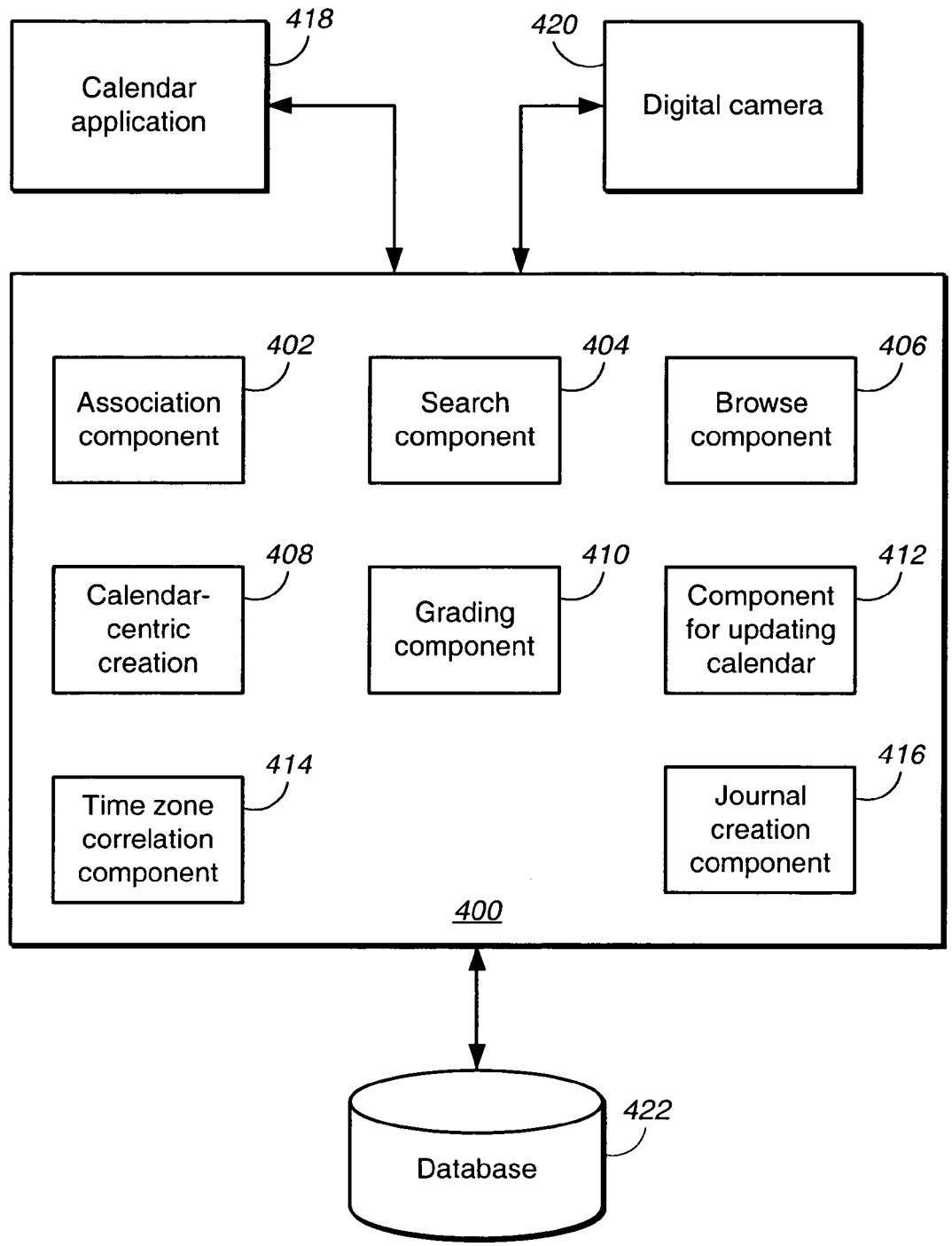
FIG._4

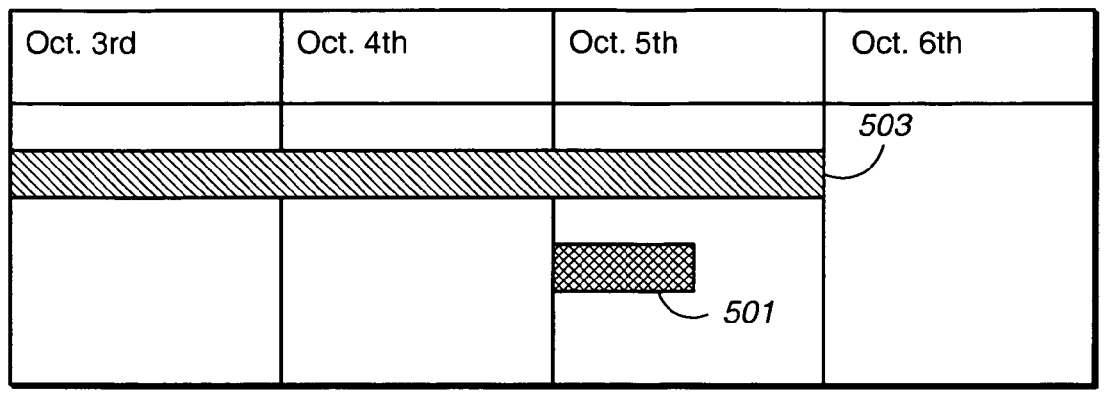
FIG._5A
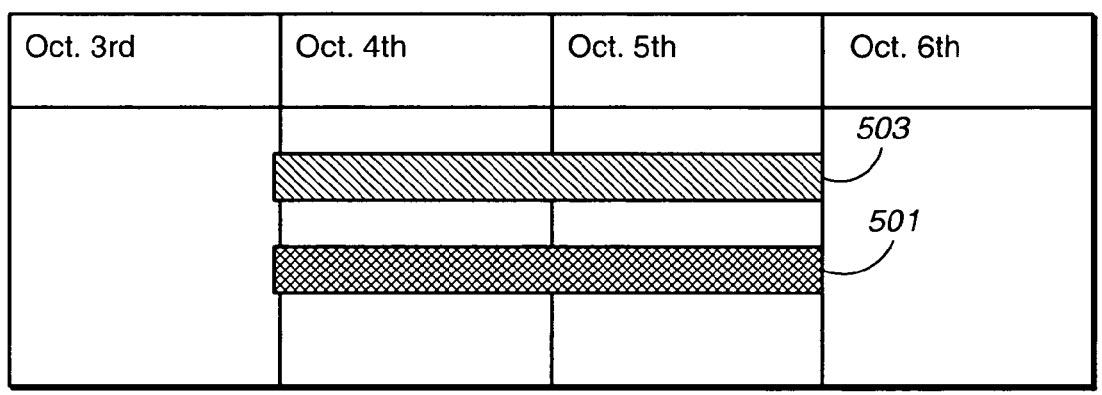
FIG._5C

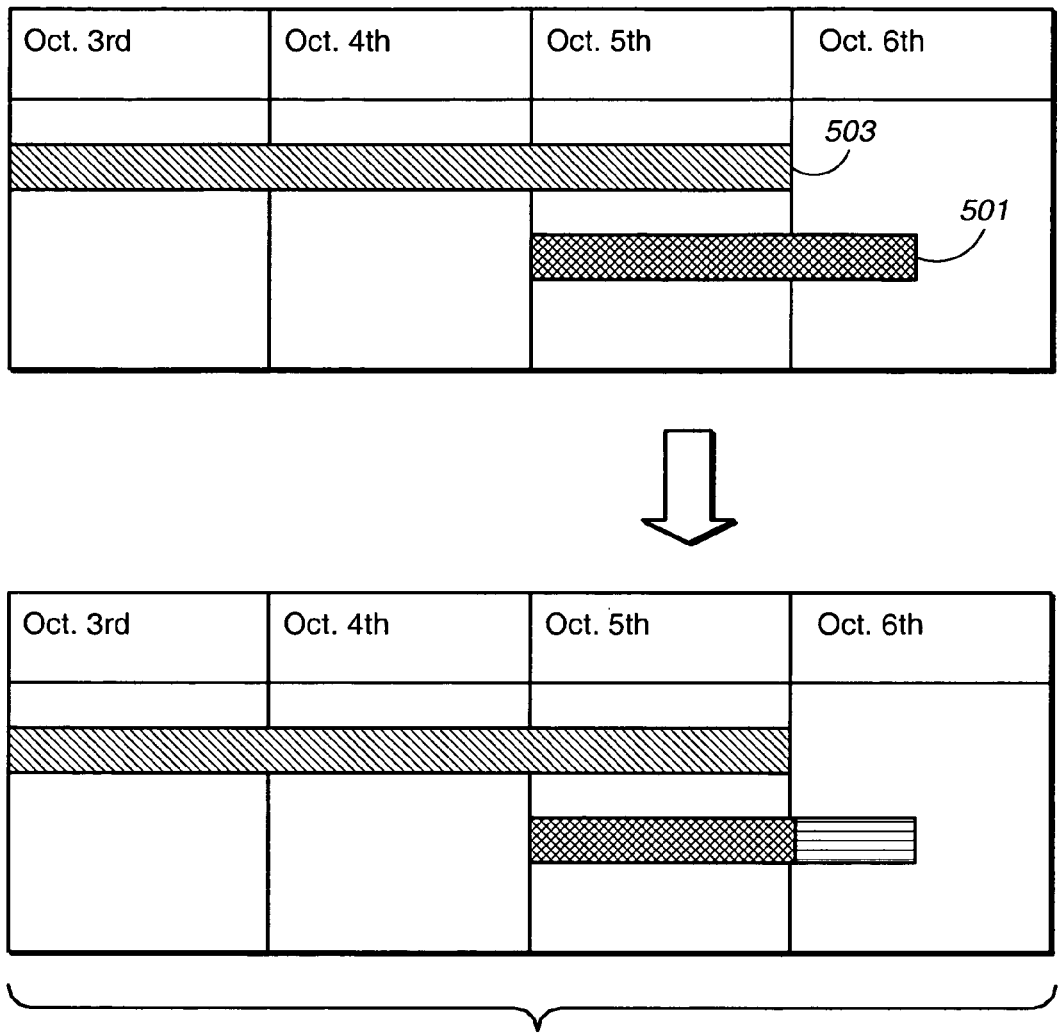
FIG._5B

FIG. 5D

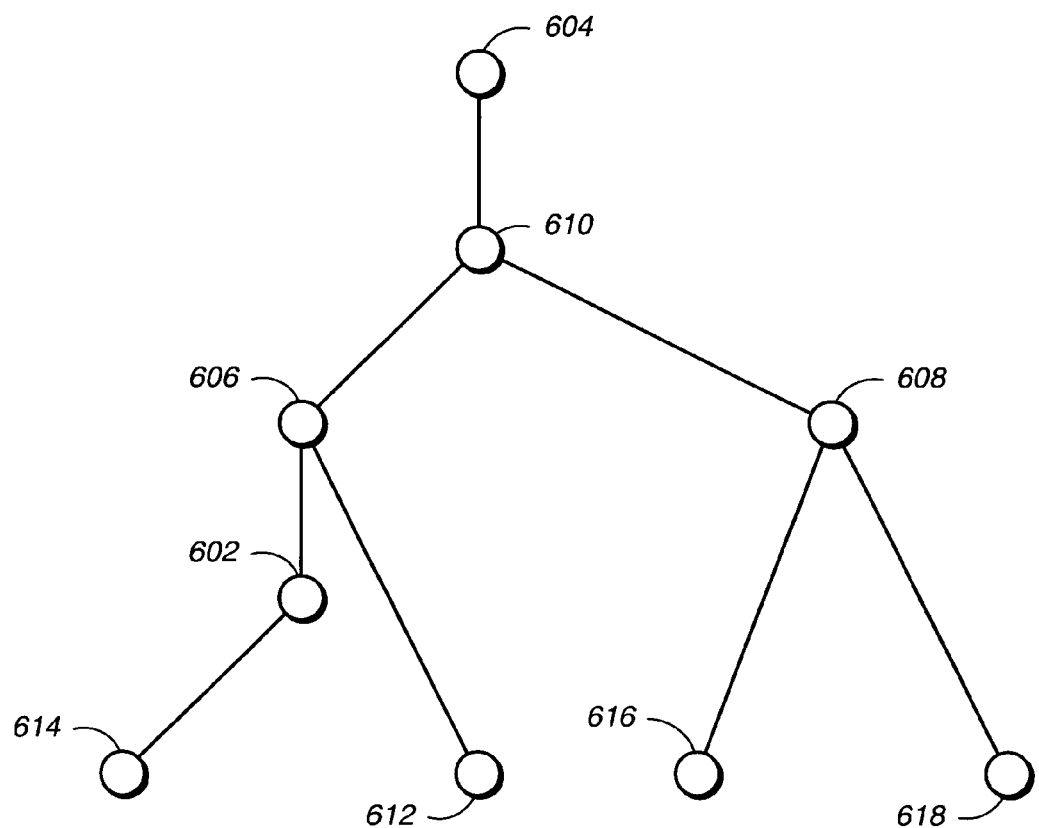
FIG._6

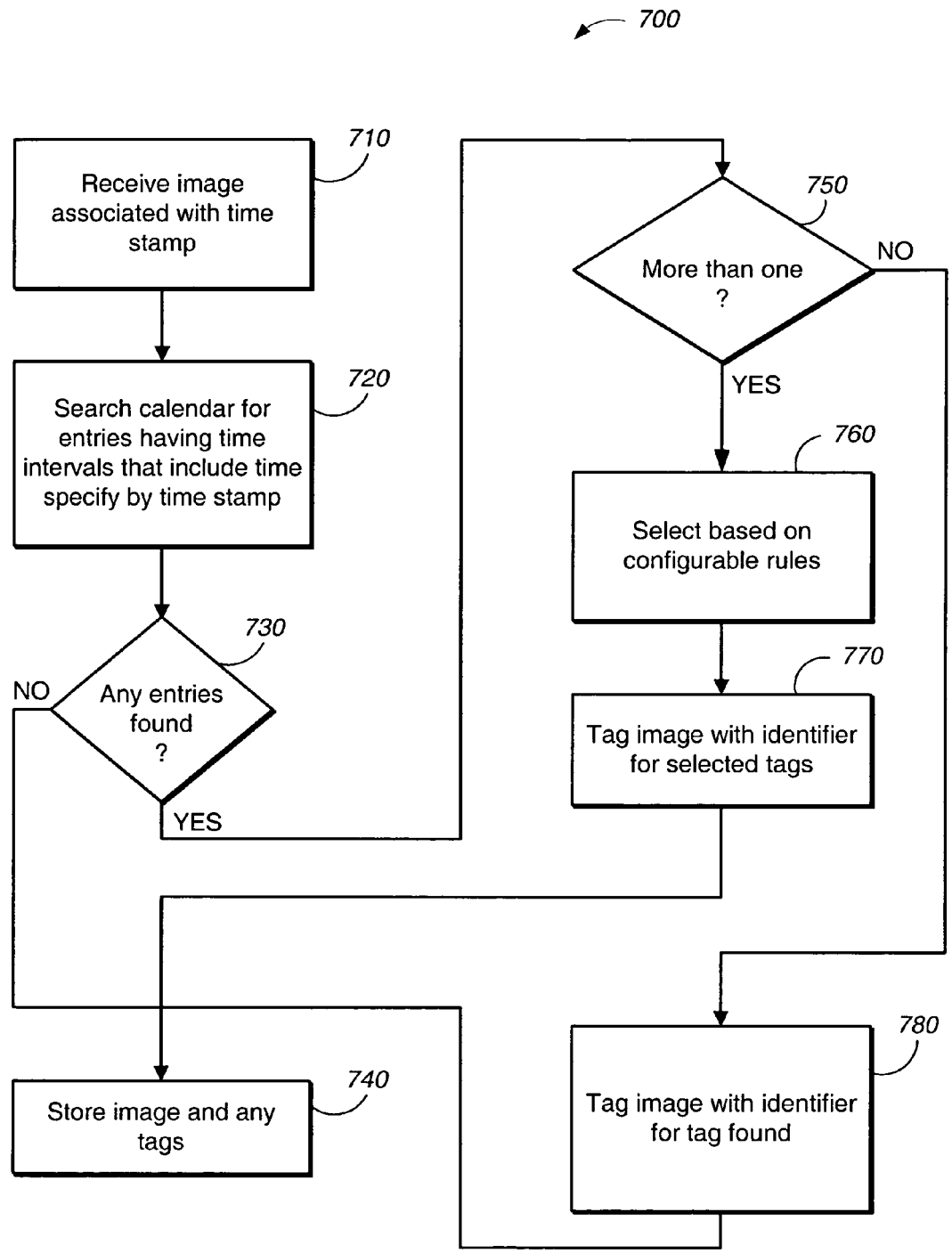
FIG._7

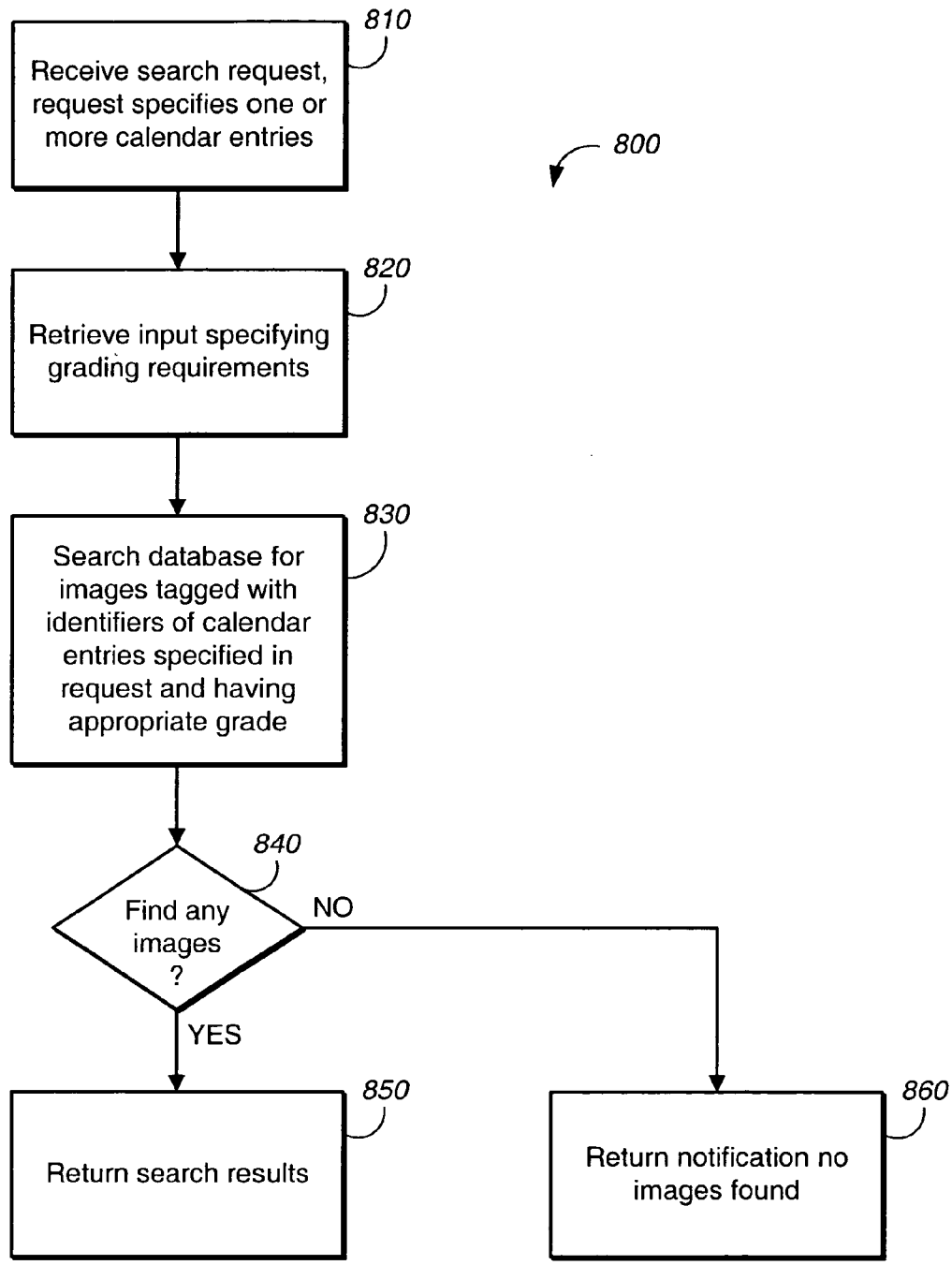
FIG._8

FIG._9

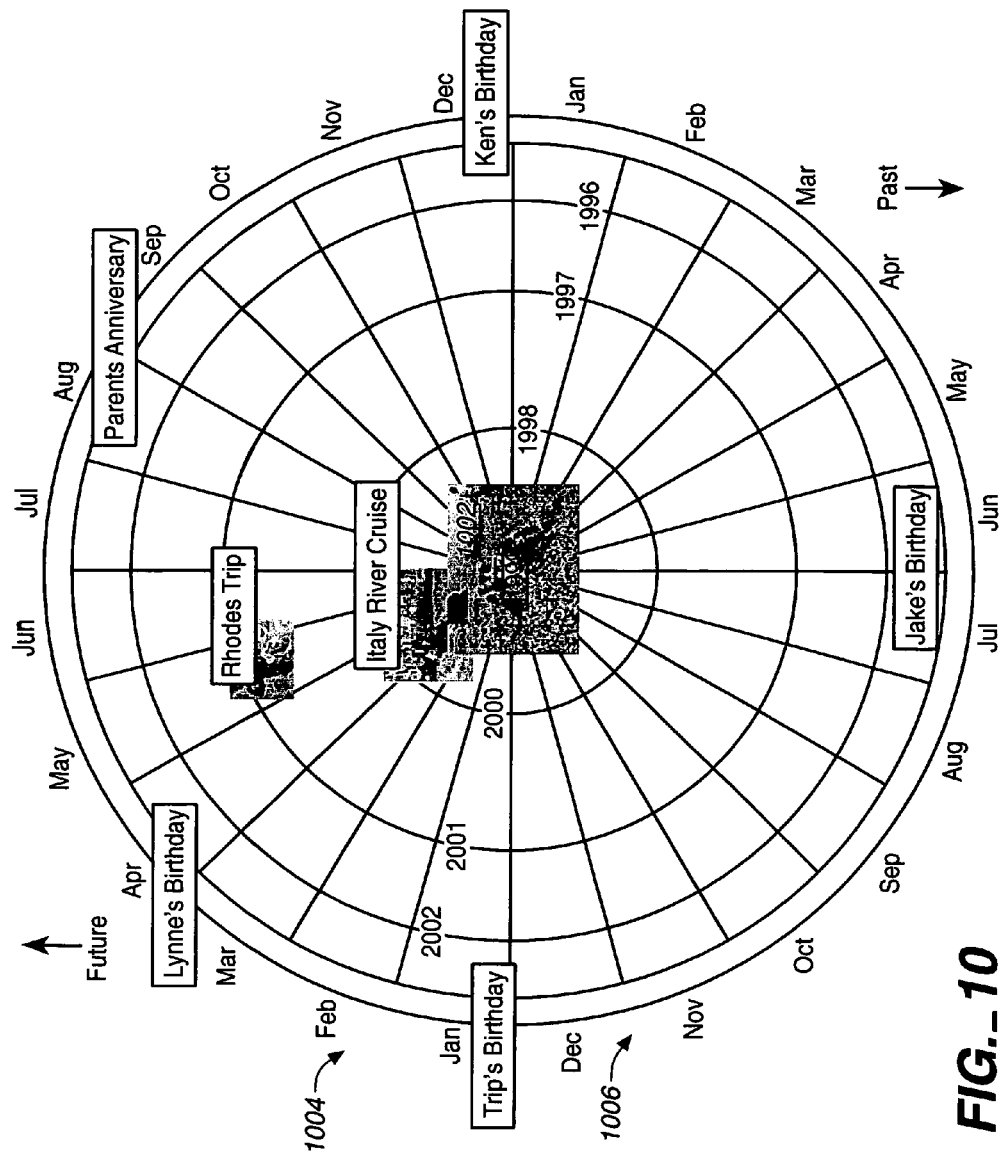
FIG._10

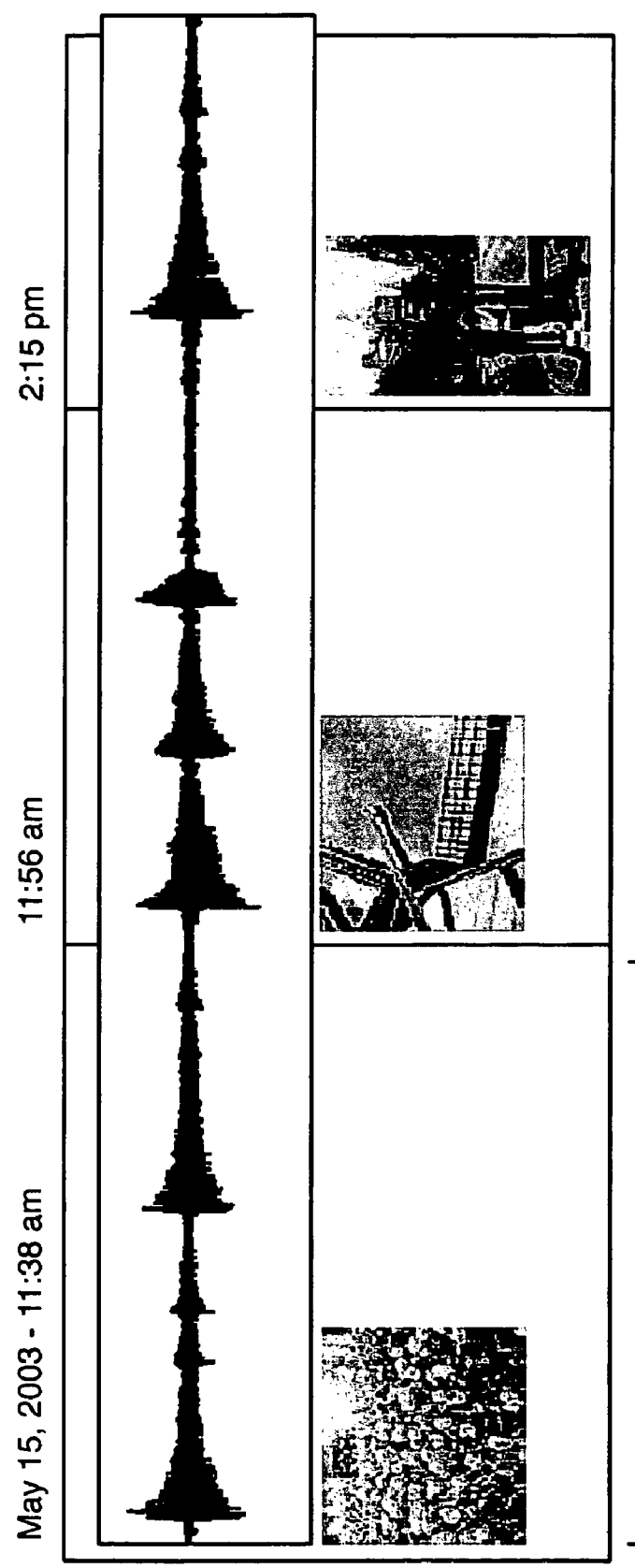
FIG._11

May 15, 2003
After a short, half an hour bus
trip from the train station in
of the tulip fields were bare
(they had been beheaded!),
but the flowers in the gardens
were still in [full bloom.]
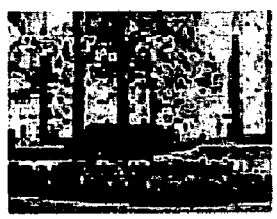
[The park was beautifully cared for.]
Besides flowers we saw our first
[windmill] there.
FIG._12

TIME-BASED IMAGE MANAGEMENT

BACKGROUND

The present invention relates to digital image management.

Real world images can be captured and stored as digital images. Devices that can capture and store real world images include but are not limited to digital cameras, scanners and digital camcorders.

Generally a digital image can be associated with a time stamp. For example, a digital image captured with a digital camera can include metadata that specifies when the image was captured. The digital image can be stored in one or more files, for example, a JPEG or TIFF file, and the metadata can be stored in any format, for example, a standard format such as EXIF. The digital image can be stored in any type of storage media, including but not limited to a disk drive of a computer and a CD.

SUMMARY

The present invention relates to methods and apparatus, including computer-program products, for time-based image management.

In general, in one aspect, the invention provides a computer-implemented method for digital image management. The method includes receiving a digital image associated with a specific time. The method includes receiving a data unit associated with a time interval. The method includes associating the data unit with the digital image when the time interval associated with the data unit includes the specific time.

In general, in another aspect, the invention provides a computer-implemented method for generating a personal calendar. The method includes receiving selection specifying a calendar entry. The method includes retrieving digital images associated with the calendar entry. The method includes including the retrieved digital images in a calendar.

In general, in another aspect, the invention provides a method for displaying images. The method includes clustering images in an image library into groups. Each image includes a time stamp that indicates when the image was captured. The method includes determining, for each group, the number of images in the group and a time interval delimited by an earliest time stamp and a latest time stamp of images in the group. The method includes determining, for each group, a time scale for displaying the group. The determining is based on the number of images in the cluster and the time interval delimited by an earliest time stamp and a latest time stamp of images of the cluster. The method includes displaying, when an image of a cluster is selected, other images of the cluster over a timeline having the time scale determined for displaying the cluster.

In general, in another aspect, the invention provides a computer-program product, tangibly stored on machine-readable medium, for digital image management. The product comprising instructions to cause a processor to receive a digital image associated with a specific time. The product includes instructions to receive a data unit associated with a time interval. The product includes instructions to associate the data unit with the digital image when the time interval associated with the data unit includes the specific time.

In general, in another aspect, the invention provides a computer-program product, tangibly stored on machine-readable medium, for generating a personal calendar. The product comprising instructions to cause a processor to receive a selection specifying a calendar entry. The product includes instructions to retrieve digital images associated with the calendar entry. The product includes instructions to include the retrieved digital images in a calendar.

In general, in another aspect, the invention provides a computer-program product, tangibly stored on machine-readable medium, for displaying images. The product includes instructions to cluster images in an image library into groups, each image including a time stamp that indicates when the image was captured. The product includes instructions to determine, for each group, the number of images in the group and a time interval delimited by an earliest time stamp and a latest time stamp of images in the group. The product includes instructions to determine, for each group, a time scale for displaying the group, the determining being based on the number of images in the cluster and the time interval delimited by an earliest time stamp and a latest time stamp of images of the cluster. The product includes instructions to display, when an image of a cluster is selected, other images of the cluster over a timeline having the time scale determined for displaying the cluster.

A system in accordance with the invention facilitates the management of digital images. The system needs little or no user effort to organize even large volumes of digital images. The system can automatically associate a topic, for example, events, geographic locations, logical locations, personal notations, people, ages of people, recurring events, other objects, such as animals or automobiles, classes of people or classes of other objects with a digital image. Once associations have been made, the system can search for digital images according to events, geographic locations and any of the above kinds of things. The system also can provide a calendar that allows a user to browse through or search for digital images. The system automatically adjusts the time scale of the calendar to facilitate browsing. Digital images captured from multiple and different sources can thus be managed. Digital images captured by two or more different digital cameras or scanners can be managed. Time stamps may be adjusted to account for digital images captured in different time zones. The system can generate with little or no user effort calendar-centric creations such as, for example, a personal calendar or a journal of digital images.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIG. 1 shows a system 100 for digital image management.

FIG. 2 shows a method 200 for associating data units with images.

FIG. 3 shows a method 300 for searching images that include data units.

FIG. 4 shows a system 400 for digital image management.

FIGS. 5A-D illustrate relationships between and among calendar entries.

FIG. 6 shows a hierarchy tree that represents relationships between and among calendar entries.

FIG. 7 shows a method 700 for associating calendar entries with images.

FIG. 8 shows a method 800 for searching images associated with calendar entries.

FIG. 9 shows an example of a calendar that facilitates browsing.

FIG. 10 shows an example of a point-of-view calendar.

FIG. 11 illustrates an example of an audio-photo journal.

FIG. 12 illustrates an example of a text-photo journal.

Like reference numbers and designations in the various drawings indicate like elements.

DETAILED DESCRIPTION

FIG. 1 shows a system 100 for managing digital images. The system 100 includes an association component 102 and a search component 104. Other components may be included that perform other functions such as browsing, correlating time zones, creating photo journals, and generating calendar-centric creations. The system 100 is connected to exchange data with one or more sources of data such as, for example, data source 106. The system is connected to receive and send digital images to and from one or more sources of digital images such as, for example, image source 108. The system can store and retrieve digital images and metadata associated with the digital images to and from one or more libraries of digital images such as library 110.

Data sources include, for example, a calendar application, an address book application or both. Data sources typically include data units, which can be, for example, data objects in an object oriented computing environment. Calendar entries in a calendar application, for example, are data units. Although data units of a calendar application can represent any topic, they typically represent time-related topics that are associated with a specific time or time interval. Time related topics include events (e.g., vacations, birthdates and projects), geographic locations (e.g., Santa Rosa, United States and Europe), logical locations (e.g., home, work, church, school, river, mountain and building), people (e.g., mom, dad, Peter and Joe), and objects (e.g., car, lake, bike and clouds). An entry in a calendar describing a vacation, for example, represents an event. An entry in the calendar describing a visit to Belgium represents a geographic location. An entry in the calendar indicating an appointment with a particular individual can represent the particular individual. A data unit that represents a time-related topic is typically associated with a time interval. For example, the above-mentioned entry describing a vacation is associated with a two-week time interval.

Image sources include images capture devices and image storage devices. Examples of image capture device include digital cameras and scanners. Examples of image storage devices include disk drives, CDs or any other source of digital data. As discussed above, digital images are associated with time stamps. Although only one image source is shown in FIG. 1, the system 100 receives digital images from multiple and different image sources.

The association component 102 is configured to associate data units with a digital image. The association component 102 includes and process configurable rules for automatically associating data units with a digital image. In one implementation, the rules are configured based on user input. Optionally, the association component 102 can request user confirmation of an automatic association. The user input can be a selection from a list or an actuation of an icon in a graphical user interface.

The search component 104 is configured to search in library 110 for digital images. Search criteria usually include a logical expression of one or more key words. The key words can be selected to specify any combination of topics, including the above-mentioned topics.

System 100 includes a software application for managing images, for example, Adobe® Photoshop® Album available from Adobe Systems of San Jose Calif. The application usually runs on a desktop computer or on a network.

FIG. 2 shows a method 200 for associating data units with images. The system receives a digital image associated with a time stamp (step 210) as well as an input selecting a source of data (step 220). The system receives one or more data units from the selected source of data (step 230). At least one of the data units is associated with a particular time interval. The system associates one or more data units with the digital image based on the image's time stamp and time intervals associated with the received data units (step 240). The system associates based on the configurable rules mentioned above. An implementation of the association rules is described below in reference to Table 1. In one implementation, the system associates a calendar entry with a digital image by storing a label of the entry in a metadata field of the digital image. Alternatively, the system can store in a database index the label of the entry and an associated pointer that points from the label to the digital image file. In a third implementation, the system combines the two techniques described above. The system stores the entry's label in the metadata field of the digital image and also in the database index. The system stores in a library, for example, library 100, the digital image and any associations made (step 250).

FIG. 3 shows a method 300 for searching images associated with data units. The system receives a search request that includes particular search criteria (step 310). As discussed, the search criteria can specify any combination of topics, including the time-related topics mentioned above. In one implementation, the search request includes a user input. The system searches a library of digital images for images having metadata that satisfies the search criteria (step 320). The system determines if any images are found (decision step 330). If the system finds images having metadata that satisfies the search criteria, then the system returns the images found (step 340). Otherwise, the system returns notification that no images were found (step 350).

FIG. 4 shows a system 400 for managing digital images. System 400 is an implementation of system 100. System 400 includes: an association component 402, a search component 404, a browse component 406, a component 408 for generating calendar-centric creations, a component 410 for grading digital images, a component 412 for updating the calendar, a time zone correlation component 414 and a journal creation component 416. System 400 may include other software components for performing other functions.

Association component 402 and search component 404 are similar to the association component 102 and search component 104, respectively, described above in reference to FIG. 1. Browse component 406 is configured to provide a graphical user interface through which a user can browse through digital images. The graphical user interface includes a calendar. Component 408 is configured to generate personal calendars having particular themes. Component 410 is configured to receive and store user input for grading a digital image. Grades can reflect, for example, a level of interest a user has for an image. Grades can also reflect the quality of an image, the importance of an event in which the image was created, such as an important birthday or anniversary. Component 412 is configured to update calendar 418 based on data associated with digital images received by system 400. Time zone correlation component 414 is configured to correlate time stamps of images captured in different time zones. Journal creation component 416 is configured to generate personal journals.

System 400 is configured to exchange information with a calendar application 418. The calendar application includes, for example, Microsoft Outlook available from the Microsoft Corporation of Redmond Wash.

System 400 is configured to receive information, including digital images, from a digital camera 420. The system 400 can interface with other sources of digital images such as additional digital cameras, scanners, disk drives, PDAs or the Internet. System 400 stores and retrieves information, including digital images and any associated metadata, to and from a database 422.

Calendar application 418 usually includes multiple calendar entries. An entry can represent any topic. As discussed above, examples of topics include an event, a geographic location, a logical location, one or more people, objects and so forth. Examples of an event include a European vacation, birthday and summer. Examples of a geographic location include Santa Rosa, the United States and Europe. Examples of a logical location include home, school, work, river, mountain and city hall.

There are various types of entries, one of which is a banner entry. Banner entries typically, but not necessarily, span over multiple days. The time interval associated with a banner entry is usually specified in terms of days and not hours. A banner entry usually, but not necessarily, represents an event or a geographic location.

Another type of entry is a day entry. Day entries typically, but not necessarily, span time intervals that fall within a day. The time interval associated with a day entry is usually specified in hours. A day entry usually, but not necessarily, represents a logical location, one or more people, objects or an event of short duration (e.g., a musical recital).

Calendar entries, whether a banner or a day entry, generally cover a contiguous time interval. A calendar entry usually includes a label and one or more notes. The label provides a general description of the entry, usually indicative, although not dispositively, of the topic the entry represents. The notes include one or more fields, which can store any sort of information. At least one of the fields can store information specifying the topic represented by the entry. Topic information provides an extra parameter, in addition to the time stamp typically stored with digital images, with which the system can organize and search its library of digital images.

The system has different techniques for obtaining topic information. In one implementation, the system identifies entries having time intervals that include the capture time of a digital image of interest. The system then prompts the user to specify a topic (for example, whether the entry represents an event, a geographic location, and so forth). Upon receipt of the user input, the system stores the input in one of the metadata fields of the digital image. Alternatively, the system receives user input specifying a topic when the user makes the entry into the calendar. In this case, the system stores the topic information in one of the notes field of the entry. In a third implementation, the system consults a list of events and applies search heuristics to identify entries that are likely to represent events. The system then presents its determination to the user for confirmation. The system takes similar actions to identify entries that represent geographic locations, logical locations, people, and objects. Examples of list consulted include address books and atlases.

Note that the system is not limited to storing only topic information in the note fields. The system can store nearly any sort of information in the note fields, even information that is not represented in the calendar. For example, the system can store in a note field of a banner entry information about a person who is not even listed in the calendar. The person can be associated with any digital image associated with the banner entry although the person is not represented by a calendar entry.

Figure 5D:
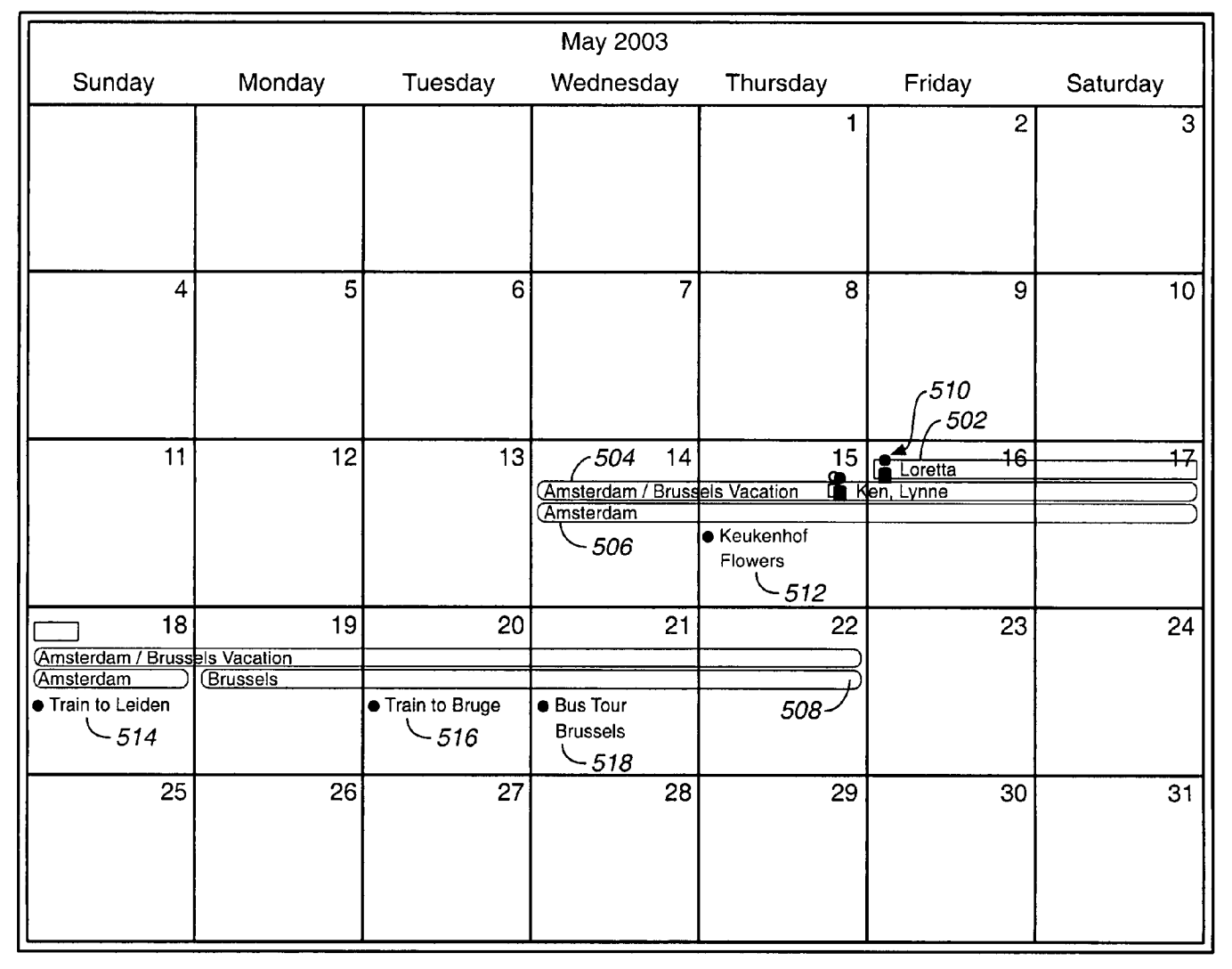

Calendar entries may overlap and, consequently, be related to one another. There may be parent-child relationships. A first entry is a child of a second entry when the following two conditions occur: (i) the duration of the time interval associated with the first entry is shorter than the duration of the time interval associated with the second entry; and (ii) the time intervals of the first and second time entries overlap. For example, the first entry is a child of the second entry when the entire time interval associated with the first entry is included in the time interval associated with the second entry. FIG. 5A shows an example of this type of overlap. The first entry 501 is entirely included in the second entry 503. The first entry is also a child of the second entry even when only a portion of its time interval falls within the time interval of the second entry. FIG. 5B shows an example of this type of overlap. The first entry 501 is only partially included in the second entry 503. If there is an overlap of time intervals and the durations of the time intervals are equal, such as the example shown in FIG. 5C, then the entries are related but it is usually not possible to determine which is the parent and which is the child using only time intervals. In one implementation, user input is used to determine the relationship between the entries when there are overlapping time intervals of the same duration. Alternatively, topics the two entries represent are used to determine their relationship. For example, topics are prioritized by order of specificity such that an entry representing the topic of greater specificity will be categorized as the child. As another alternative, the entry type is used to help determine the relationship between two entries. For example, entry types are prioritized by order of specificity such that an entry type of greater specificity is categorized as the child. In a third alternative, both entry type and topic specificity is used to determine relationships between entries when time interval alone is insufficient.

In additional to having the first entry as its child, the second entry may have other children. Furthermore, the second entry may have one or more grandchildren. For example, the time interval of the first entry can include time intervals of a third entry and a fourth entry. In this case, the third and fourth entries are children of the first entry and grandchildren of the second entry.

FIG. 5D shows an example of a calendar. The calendar includes banner entry 502 that represents a person named Loretta, a banner entry 504 that represents an Amsterdam/Brussels vacation, a banner entry 506 that represents Amsterdam, a banner entry 508 that represents Brussels, and a banner entry 510 that represents two people whose names are Ken and Lynne. Banner entries 502 and 510 represent one or more people and are referred to in this specification as person entries. Banner entry 504 represents an event and is referred to in this specification as an event entry. Banner entries 506 and 508 represent geographic locations and are referred to in this specification as place entries.

The calendar also includes a day entry 512 that represents a tour of Keukenhof Flowers, a day entry 514 that represents a train trip to Leiden, a day entry 516 that represents a train trip to Bruge, and a day entry 518 that represents a bus tour of Brussels. Day entries 512, 514, and 516 are place entries. Day entry 518 is an event entry.

As can be seen from FIG. 5D, banner entry 504 is the parent of banner entry 510. Banner entry 510 is the parent of banner entry 506. Note that there is an association rule which specifies that when entries are coextensive, the one that represents the more specific topic is the child node. Consequently, although banner entries 504 and 510 are coextensive, banner entry 510 represents a more specific topic and, thus, is the child entry. Banner entry 506 is the parent of entries 502 and 512. Banner entry 502 is the parent of entry 514. Banner entry 510 is the parent of banner entry 508. Banner entry 508 is the parent of entries 516 and 518.

In general, the relationship between or among entries can be represented in a hierarchy tree. In the tree, each node represents an entry and lines connecting the nodes represent relationships between or among entries. The tree may include multiple layers, each of which can include a generation of one or more nodes. The level of specificity of entries increases towards the bottom of the tree. That is, nodes located at a particular layer of the tree represent more specific entries than do nodes of the layers located above the particular layer.

FIG. 6 shows and example hierarchy tree that represent the entries of the calendar shown in FIG. 5D. Nodes 602, 604, 606, 608, 610, 612, 614, 616 and 618 represent calendar entries 502, 504, 506, 508, 510, 512, 514, 516 and 518, respectively. Entry 504 is at the top because although it is coextensive with entry 502, entry 502 represents a more specific topic than does entry 504.

Association component 402 is configured to associate calendar entries with a digital image. FIG. 7 shows a method 700 for associating calendar entries with images. The system 400 receives a digital image associated with time stamp (step 710). The time stamp specifies a particular time when the digital image was captured. The system 400 searches a calendar provided by calendar application 418 for entries having time intervals that include the particular time specified by the time stamp (step 720). The system determines if any entries were found (decision step 730). If no entries were found, then the system stores the digital image with any metadata already included with the image (step 740). Otherwise, the system determines if there is more than one entry found (decision step 750). If there are more than one entry found, then the system selects, based on the above-mentioned configurable rules, which of the entries found is to be associated with the digital image (step 760). The system tags the digital image with metadata identifying the selected entries, for example, respective labels of the selected entries or identifiers unique to their respective entries (step 770). If there is only one entry found, then the system tags the digital image with metadata identifying the one entry, for example, the label of the one entry or an identifier unique to the one entry (step 780). Whether there are one or multiple entries found, the system stores in database 420 the digital image and any tags associated with the image (step 740).

Table 1 shows examples of association rules. The system 400 can receive user inputs and change a rule in accordance with such inputs.

TABLE 1

1. When time intervals of two entries overlap, the entry having the shorter time interval is the child node.
2. When time intervals of two entries overlap and the overlap is skewed (like the overlap shown in FIG. 5B), divide the entry with the shorter time interval into a first portion 501A which overlaps with the other entry and a second portion 501B which does not overlap with the other entry, e.g., entry 503. The first portion 501A is a child of the other entry. The first and second portions are then treated as separate entries.
3. When time intervals of two entries are coextensive, the entry that represents the more specific topic is the child node. An example of an order of specificity is:
   event;
   geographic location;
   logical location, people, and objects.

TABLE 1-continued

4. When there is only one entry whose time interval includes the time stamp of a digital image and the entry is one of an event and a geographic location, automatically associate the entry with the digital image.
5. When there are multiple entries whose respective time intervals each include a time stamp of a digital image, associate with the digital image all entries as long as there are not two geographic location entries that overlap. When there are two geographic entries that overlap, associate with the digital image the entry having the shorter time interval.
6. Associate multiple event entries with digital images as long as each time interval is contiguous.
7. Request confirmation before associating entries that represent a logical location, person or object. Alternatively, present these entries to a user for selection and manual association.

Search component 404 is configured to search database 420 for digital images. FIG. 8 shows a method 800 for searching images associated with calendar entries. System 400 receives a search request that specifies one or more calendar entries (step 810). System 400 receives an input that specifies grading requirements (step 820). Generally, grades are an indication of a level of interest a user has for an image. A grading requirement, in this case, specifies a minimum level of interest. Grades can also indicate the quality of an image, the importance of the time the image was created, such as an important birthday or anniversary, as well as any other metrics. In one implementation, system 400 employs one type of grade to indicate overall interest and another type of grade to indicate quality. In this case, grading requirements specify a minimum level of interest as well as a minimum level of quality. System 400 searches for digital images associated with the calendar entries and that satisfy the grading requirements (step 830). System 400 determines if any digital images are found (decision step 840). If yes, then the system returns the search results (step 850), which can include retrieving and displaying the images found. Otherwise, the system returns notification that no images were found (step 840).

As discussed above in reference to FIG. 4, system 400 includes browse component 406. FIG. 9 shows one implementation, in which browse component 406 provides, in a graphical user interface of system 400, a calendar 900 through which a user can browse through digital images stored in database 422. The calendar 900 can provide framework that organized digital images. Each date on a calendar can, for example, include a link to digital images captured on that date. Each entry on a calendar can, for example, include a link to digital images associated with the entry. Digital images can be displayed in the space of the calendar used to represent one day, e.g., space 902. Digital images can also be shown as a picture outside of the calendar grid of dates.

Browse component 406 can automatically adjust the scale of the calendar depending on a ratio of (i) the number of digital images being browsed through and (ii) a duration of the time interval being displayed. In one implementation, browser component 406 adjusts the interval so as to maintain this ratio at a predetermined value. The predetermine value is set so that the calendar is neither too sparsely nor too densely populated with images. For example, if a user is browsing through hundreds of digital images associated with an event that took place over only two hours, then the component can adjust the scale of the calendar to indicate a finer granularity of time units such as, for example, minutes. However, if the event took place over ten years and there are only ten digital images associated with the event, then the component can adjust the scale of the calendar to indicate time units as years.

Browse component 406 can provide special types of calendars such as, for example, a point-of-view ("POV") calendar. FIG. 10 shows an example of the POV calendar. A digital image 1002 of interest is displayed in the center of the POV calendar. The center of the POV represents the time specified by the digital image of interest (i.e., a particular time of interest). The top semicircle 10004 represents time after the time of interest. The bottom semicircle 1006 represents time before the time of interest. Selecting a new digital image of interest will change the time of interest to the time indicated by the time stamp of the new digital image. Selecting the new digital image of interest also shifts the time frame indicated by the POV calendar. Digital images are displayed at the position in the POV calendar according to their respective time stamps. Thus, the shifting of the time frame shifts the digital images.

Grading component 410 is configured to allow a user to specify grades such as favorite, keeper, possible, backup and discard. In one implementation, grading component 410 receives a user input selecting one of these grades for each digital image being considered. The system 400 stores the selected grade as metadata of a digital image file.

During searching or browsing, system 400 receives user input specifying grading requirements to reduce the number of digital images being considered. In response, the system 400 presents in its graphical user interface a slider control with which a user can specify the grades that are of interest. Digital images having grades below the specified grade will not be searched or presented for browsing.

Time zone correlation component 414 is configured to correlate time stamps of images captured in different time zones. In one implementation, the default action of component 414 is to time shift time stamps of images captured in time zones that are different from a home time zone of the camera. If the clock of the capture device (camera) were not adjusted, but instead left on the home time zone, the time shift is needed.

In one implementation, component 414 is configured to identify, based on calendar entries that indicate geographic location and the capture time of a digital image, the time zone in which the image was captured. When the system 400 receives the digital image, the component 414 can shift the time stamp to the home time zone.

In implementations where location information is included in the metadata of a digital image file, component 414 can determine time shift based on the location information. A digital camera with a GPS device, for example, can produce digital image files having location information.

Component 412 is configured to update calendar 418 with data included in digital images system 400 receives. For example, when the digital image includes metadata indicating an event that is not already included in calendar 418, component 412 processes the metadata and make an entry in calendar 418 to indicate the occurrence of the event.

Component 408 is configured to automatically or semi-automatically generate calendar-centric creations. In one implementation, component 408 automatically generates a storybook of images for a particular time interval. Component 408 identifies events that occurred during the interval (as annotated on calendar 418). Component 408 prioritizes the events based on their position in the hierarchy of events. Events that are parent nodes, for example, would be selected over events that are child nodes in the hierarchy. The label of the top event in the hierarchy is used as the title of the storybook. Events in a next lower level of the hierarchy are used to describe chapters of the storybook. Component 408 selects digital images to include in the storybook based on the events selected. Component 408 optionally creates an index based on metadata associated with the digital images captured during the particular time interval.

Component 408 is configured to automatically generate a personalized calendar. Component 408 selects digital images to include in the calendar based on events that occurred throughout the previous year. Component 408 selects digital images based on themes specified by a user. One common theme is holidays. Images selected can be those associated with major holidays. Another theme can be birthdays. Images selected can be those associated with birthday events.

Component 408 is configured to generate a year-in-review creation. Component 408 selects digital images associated with major events of a past year, as annotated on a calendar being considered, and includes these in an archive for the past year.

Component 416 is configured to create journals. In one implementation, component 416 receives input specifying a time interval. Component 416 retrieves and display digital images captured during the interval. Component 416 receives user input selecting images from those being displayed. Component 416 generates a slide show of the images selected. Component 416 receives an input specifying the duration an image is to be displayed. Component 416 receives input associating any of the images with one or more text files, audio files or both. Component 416 further receives input specifying a specific time within a time duration that an image is being displayed so as to contemporaneously display or play the text or audio file, respectively. Alternatively, component 416 receives input specifying points along a timeline of an audio file and, furthermore, associates digital images to be displayed at the points. FIG. 11 illustrates an example of an audio-photo journal. Similarly, component 416 receives input specifying points along a timeline of a read along text file. As a highlighted section moves into a portion of text, digital images associated with the portion appear. FIG. 12 illustrates and example of a text-photo journal.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results. A system of the invention can be implemented not only in a desktop computer but also in consumer electronic device such as DVD players, PDAs, and TiVo devices. The system provides override features that allow a user to override any automatic associations made or to change any manual association made. For example, dragging a digital image to a particular interval in a calendar causes the system to associate with the digital image entries that are associated with the particular interval. Furthermore, the system reassigns a new time stamp to the digital image. The previously stored time stamp is written over. The system is not limited to only topics included in a calendar but, rather, can define and use any topic to organize and search for digital images. The system has features for organizing digital images even when the images are missing a time, a date, or the time and date from its time stamp. In one implementation, the system provides a searchable value for unknown time information. The system provides features for grouping digital images over time intervals of various durations. In one implementation, the system groups images captured using exposure, balance and flash bracketing. In this case, the duration of the time interval of the group is on the scale of seconds. Alternatively, the system groups images taken on a long journey. The duration of the time interval of this grouping is on the scale of days.

What is claimed is:

1. A computer-implemented method for digital image management, comprising:
　receiving input defining a plurality of calendar entries, each calendar entry in the plurality of calendar entries comprising a respective topic and a respective time interval, wherein a rule specifies the respective topic for at least one calendar entry;
　identifying a digital image, the digital image being associated with a time stamp;
　automatically selecting a calendar entry in the plurality of calendar entries, the selected calendar entry having a time interval that includes the time stamp of the image, wherein calendar entry selection includes comparing overlap of the time interval to designate a parent calendar entry and comparing specificity of the topic, wherein the calendar entry is split absent complete overlap, the comparison is based on configurable rules, the rules including one or more of:
　　(a) if one calendar entry's time interval is longer than and totally overlaps the other calendar entry's time interval, the calendar entry having the longer time interval is designated to be a parent calendar entry of the calendar entry having the shorter time interval, and the parent calendar entry is associated with the image;
　　(b) if neither calendar entry's time interval lies completely within the other calendar entry's time interval, then the shorter calendar entry is split into a third and fourth calendar entry, the third calendar entry being the part overlapping the longer calendar entry and the fourth being the part not overlapping the longer calendar entry, then the longer calendar entry is designated to be a parent calendar entry of the third calendar entry, and the parent calendar entry is associated with the image;
　　(c) if the two time intervals are coextensive, then the calendar entry with a less specific topic is designated to be a parent calendar entry of the calendar entry with a more specific topic, and the parent calendar entry is associated with the image; or
　　(d) so long as the two topics do not both represent geographic locations, both calendar entries are associated with the image; and
　automatically associating the selected calendar entry with the digital image; and
　displaying a presentation of the time interval and the digital image.

2. A computer-implemented method for digital image management, comprising:
　receiving a digital image, the digital image being associated with a time stamp;
　receiving input defining a first calendar entry comprising a first topic and a first time interval, the first time interval including the time stamp, wherein a rule specifies the first topic for the first calendar entry;
　receiving input defining a second calendar entry comprising a second topic and a second time interval, the second time interval overlapping with the first time interval and including the time stamp;
　comparing specificity of the first topic with second topic and overlap of the first time interval with the second time interval to designate a parent calendar entry, wherein the calendar entry is split absent complete overlap, the comparison based upon configurable rules, wherein the comparison is based on configurable rules, the rules including one or more of:
　　(a) if one calendar entry's time interval is longer than and totally overlaps the other calendar entry's time interval, the calendar entry having the longer time interval is designated to be a parent calendar entry of the calendar entry having the shorter time interval, and the parent calendar entry is associated with the image;

(b) if neither calendar entry's time interval lies completely within the other calendar entry's time interval, then the shorter calendar entry is split into a third and fourth calendar entry, the third calendar entry being the part overlapping the longer calendar entry and the fourth being the part not overlapping the longer calendar entry, then the longer calendar entry is designated to be a parent calendar entry of the third calendar entry, and the parent calendar entry is associated with the image;

(c) if the two time intervals are coextensive, then the calendar entry with a less specific topic is designated to be a parent calendar entry of the calendar entry with a more specific topic, and the parent calendar entry is associated with the image; or (d) so long as the two topics do not both represent geographic locations, both calendar entries are associated with the image;

based upon the comparison, automatically selecting one of the calendar entries to associate with the digital image; and storing an association between the selected calendar entry and the digital image on a computer-readable medium.

3. The computer-implemented method of claim 2, wherein:
each calendar entry further includes a note, the note including a classification for the topic represented by the calendar entry; and
the selecting is based on classifications of the topics represented by the calendar entries.

4. The computer-implemented method of claim 1, wherein:
the storing of the association includes tagging the digital image with an identifier of the calendar entry.

5. The computer-implemented method of claim 4, wherein:
the digital image is stored in a file that includes a metadata field;
the calendar entry includes a label; and
the tagging includes storing the label in the metadata field.

6. The computer-implemented method of claim 4, wherein rules specify the topic of the calendar entry represents one of a person, a geographic location, a logical location and an object.

7. The computer-implemented method of claim 1, further comprising:
receiving an image grade definable by input, the image grade specifying a level of interest for the digital image;
associating the image grade with the digital image; and
storing an association between the image grade and the digital image on the computer-readable medium.

8. The computer-implemented method of claim 7, further comprising:
receiving search criteria specifying a threshold grade; and
searching the computer-readable medium for digital images that have grades exceeding the threshold grade.

9. The computer-implemented method of claim 1, further comprising:
receiving an image grade definable by input, the image grade specifying a level of quality for the digital image;
associating the image grade with the digital image; and
storing an association between the image grade and the digital image on the computer-readable medium.

10. The computer-implemented method of claim 9, further comprising:
receiving search criteria specifying a threshold grade; and
searching the computer-readable medium for digital images that have grades exceeding the threshold grade.

11. The computer-implemented method of claim 1, further comprising:

receiving one of a text file, audio file or video file; and
associating the text file, audio file, or video file with the digital image.

12. The computer-implemented method of claim 1, further comprising:
receiving search criteria specifying a particular calendar entry in the plurality of calendar entries; and
searching for digital images associated with the particular calendar entry.

13. The computer-implemented method of claim 1, further comprising:
presenting a link with the selected calendar entry, the link being configured to return any digital images associated with the selected calendar entry.

14. The computer-implemented method of claim 1, wherein the selected calendar entry further includes a note field, the method further comprising:
receiving input specifying a topic; and
storing the input into the note field.

15. A computer-program product, tangibly stored on a computer-readable medium, for digital image management, the product comprising instructions to cause a processor to:
receive input defining a plurality of calendar entries, each calendar entry in the plurality of calendar entries comprising a respective topic and a respective time interval, wherein a rule specifies the respective topic for at least one calendar entry;
identify a digital image, the digital image being associated with a time stamp;
select a calendar entry in the plurality of calendar entries, the selected calendar entry having a time interval that includes the time stamp of the image, wherein calendar entry selection includes comparing overlap of the time interval to designate a parent calendar entry and comparing specificity of the topic, wherein the calendar entry is split absent complete overlaps the comparison is based on configurable rules, the rules including one or more of:

(a) if one calendar entry's time interval is longer than and totally overlaps the other calendar entry's time interval, the calendar entry having the longer time interval is designated to be a parent calendar entry of the calendar entry having the shorter time interval, and the parent calendar entry is associated with the image;

(b) if neither calendar entry's time interval lies completely within the other calendar entry's time interval, then the shorter calendar entry is split into a third and fourth calendar entry, the third calendar entry being the part overlapping the longer calendar entry and the fourth being the part not overlapping the longer calendar entry, then the longer calendar entry is designated to be a parent calendar entry of the third calendar entry, and the parent calendar entry is associated with the image;

(c) if the two time intervals are coextensive, then the calendar entry with a less specific topic is designated to be a parent calendar entry of the calendar entry with a more specific topic, and the parent calendar entry is associated with the image; or (d) so long as the two topics do not both represent geographic locations, both calendar entries are associated with the image;

automatically associate the selected calendar entry with the digital image; and
displaying a presentation of the time interval and the digital image.

16. A system for digital image management comprising:
a processor for executing digital image management instructions;
means for receiving input defining a plurality of calendar entries, each calendar entry in the plurality of calendar entries comprising a respective topic and a respective time interval, wherein a rule specifies the respective topic for at least one calendar entry;
means for identifying a digital image, the digital image being associated with a time stamp;
means for selecting a calendar entry in the plurality of calendar entries, the selected calendar entry having a time interval that includes the time stamp of the image, wherein calendar entry selection includes comparing overlap of the time interval to designate a parent calendar entry and comparing specificity of the topic, wherein the calendar entry is split absent complete overlap, the comparison is based on configurable rules, the rules including one or more of:
  (a) if one calendar entry's time interval is longer than and totally overlaps the other calendar entry's time interval, the calendar entry having the longer time interval is designated to be a parent calendar entry of the calendar entry having the shorter time interval, and the parent calendar entry is associated with the image;
  (b) if neither calendar entry's time interval lies completely within the other calendar entry's time interval, then the shorter calendar entry is split into a third and fourth calendar entry, the third calendar entry being the part overlapping the longer calendar entry and the fourth being the part not overlapping the longer calendar entry, then the longer calendar entry is designated to be a parent calendar entry of the third calendar entry, and the parent calendar entry is associated with the image;
  (c) if the two time intervals are coextensive, then the calendar entry with a less specific topic is designated to be a parent calendar entry of the calendar entry with a more specific topic, and the parent calendar entry is associated with the image; or
  (d) so long as the two topics do not both represent geographic locations, both calendar entries are associated with the image;
means for automatically associating the selected calendar entry with the digital image; and
means for displaying a presentation of the time interval and the digital image.

17. The computer-implemented method of claim 1, further comprising:
presenting the selected calendar entry on a display device, the calendar entry being presented in a calendar-centric representation including a presentation of:
the time interval, and
the digital image.

18. A computer program product, encoded on a computer-readable medium, operable to cause data processing apparatus to perform operations comprising:
receiving a digital image, the digital image being associated with a time stamp;
receiving input defining a first calendar entry comprising a first topic and a first time interval, the first time interval including the time stamp, wherein a rule specifies the first topic for the first calendar entry;
receiving input defining a second calendar entry comprising a second topic and a second time interval, the second time interval overlapping with the first time interval and including the time stamp;
comparing specificity of the first topic with second topic and overlap of the first time interval with the second time interval to designate a parent calendar entry, wherein the calendar entry is split absent complete overlap, the comparison based upon configurable rules, wherein the comparison is based on configurable rules, the rules including one or more of:
  (a) if one calendar entry's time interval is longer than and totally overlaps the other calendar entry's time interval, the calendar entry having the longer time interval is designated to be a parent calendar entry of the calendar entry having the shorter time interval, and the parent calendar entry is associated with the image;
  (b) if neither calendar entry's time interval lies completely within the other calendar entry's time interval, then the shorter calendar entry is split into a third and fourth calendar entry, the third calendar entry being the part overlapping the longer calendar entry and the fourth being the part not overlapping the longer calendar entry, then the longer calendar entry is designated to be a parent calendar entry of the third calendar entry, and the parent calendar entry is associated with the image;
  (c) if the two time intervals are coextensive, then the calendar entry with a less specific topic is designated to be a parent calendar entry of the calendar entry with a more specific topic, and the parent calendar entry is associated with the image; or
  (d) so long as the two topics do not both represent geographic locations, both calendar entries are associated with the image;
based upon the comparison, automatically selecting one of the calendar entries to associate with the digital image; and
storing an association between the selected calendar entry and the digital image on a computer-readable medium.

19. The computer program product of claim 18, wherein:
each calendar entry further includes a note, the note including a classification for the topic represented by the calendar entry; and
the selecting is based on classifications of the topics represented by the calendar entries.

20. A system comprising:
a processor for executing instructions;
means for receiving a digital image, the digital image being associated with a time stamp;
means for receiving input defining a first calendar entry comprising a first topic and a first time interval, the first time interval including the time stamp, wherein a rule specifies the first topic for the first calendar entry;
means for receiving input defining a second calendar entry comprising a second topic and a second time interval, the second time interval overlapping with the first time interval and including the time stamp;
means for comparing specificity of the first topic with second topic and overlap of the first time interval with the second time interval to designate a parent calendar entry, wherein the calendar entry is split absent complete overlap, the comparison based upon configurable rules, wherein the comparison is based on configurable rules, the rules including one or more of:

(a) if one calendar entry's time interval is longer than and totally overlaps the other calendar entry's time interval, the calendar entry having the longer time interval is designated to be a parent calendar entry of the calendar entry having the shorter time interval, and the parent calendar entry is associated with the image;
(b) if neither calendar entry's time interval lies completely within the other calendar entry's time interval, then the shorter calendar entry is split into a third and fourth calendar entry, the third calendar entry being the part overlapping the longer calendar entry and the fourth being the part not overlapping the longer calendar entry, then the longer calendar entry is designated to be a parent calendar entry of the third calendar entry, and the parent calendar entry is associated with the image;
(c) if the two time intervals are coextensive, then the calendar entry with a less specific topic is designated to be a parent calendar entry of the calendar entry with a more specific topic, and the parent calendar entry is associated with the image; or
(d) so long as the two topics do not both represent geographic locations, both calendar entries are associated with the image;
means for based upon the comparison, automatically selecting one of the calendar entries to associate with the digital image; and
a database for storing an association between the selected calendar entry and the digital image on a computer-readable medium.

21. The system of claim 20, wherein:
each calendar entry further includes a note, the note including a classification for the topic represented by the calendar entry; and
the selecting is based on classifications of the topics represented by the calendar entries.

22. The computer program product of claim 15, wherein:
the storing of the association includes tagging the digital image with an identifier of the calendar entry.

23. The computer program product of claim 22, wherein:
the digital image is stored in a file that includes a metadata field;
the calendar entry includes a label; and
the tagging includes storing the label in the metadata field.

24. The computer program product of claim 22, wherein rules specify the topic of the calendar entry represents one of a person, a geographic location, a logical location and an object.

25. The computer program product of claim 15, the product further comprising instructions to cause a processor to:
receive an image grade definable by input, the image grade specifying a level of interest for the digital image;
associate the image grade with the digital image; and
store an association between the image grade and the digital image on the computer-readable medium.

26. The computer program product of claim 25, the product further comprising instructions to cause a processor to:
receive search criteria specifying a threshold grade; and
search the computer-readable medium for digital images that have grades exceeding the threshold grade.

27. The computer program product of claim 15, the product further comprising instructions to cause a processor to:
receive an image grade definable by input, the image grade specifying a level of quality for the digital image;
associate the image grade with the digital image; and
store an association between the image grade and the digital image on the computer-readable medium.

28. The computer program product of claim 27, the product further comprising instructions to cause a processor to:
receive search criteria specifying a threshold grade; and
search the computer-readable medium for digital images that have grades exceeding the threshold grade.

29. The computer program product of claim 15, the product further comprising instructions to cause a processor to:
receive one of a text file, audio file or video file; and
associate the text file, audio file, or video file with the digital image.

30. The computer program product of claim 15, the product further comprising instructions to cause a processor to:
receive search criteria specifying a particular calendar entry in the plurality of calendar entries; and
search for digital images associated with the particular calendar entry.

31. The computer program product of claim 15, the product further comprising instructions to cause a processor to:
present a link with the selected calendar entry, the link being configured to return any digital images associated with the selected calendar entry.

32. The computer program product of claim 15, wherein the selected calendar entry further includes a note field, the product further comprising instructions to cause a processor to:
receive input specifying a topic; and
store the input into the note field.

33. The computer program product of claim 15, the product further comprising instructions to cause a processor to:
present the selected calendar entry on a display device, the calendar entry being presented in a calendar-centric representation including a presentation of:
the time interval, and
the digital image.

34. The system of claim 16, wherein:
the storing of the association includes tagging the digital image with an identifier of the calendar entry.

35. The system of claim 34, wherein:
the digital image is stored in a file that includes a metadata field;
the calendar entry includes a label; and
the tagging includes storing the label in the metadata field.

36. The system of claim 34, wherein rules specify the topic of the calendar entry represents one of a person, a geographic location, a logical location and an object.

37. The system of claim 16, further comprising:
means for receiving an image grade definable by input, the image grade specifying a level of interest for the digital image;
means for associating the image grade with the digital image; and
means for storing an association between the image grade and the digital image on the computer-readable medium.

38. The system of claim 37, further comprising:
means for receiving search criteria specifying a threshold grade; and
means for searching the computer-readable medium for digital images that have grades exceeding the threshold grade.

39. The system of claim 16, further comprising:
means for receiving an image grade definable by input, the image grade specifying a level of quality for the digital image;
means for associating the image grade with the digital image; and
means for storing an association between the image grade and the digital image on the computer-readable medium.

40. The system of claim 39, further comprising:

means for receiving search criteria specifying a threshold grade; and means for searching the computer-readable medium for digital images that have grades exceeding the threshold grade.

41. The system of claim 16, further comprising:

means for receiving one of a text file, audio file or video file; and means for associating the text file, audio file, or video file with the digital image.

42. The system of claim 16, further comprising:

means for receiving search criteria specifying a particular calendar entry in the plurality of calendar entries; and means for searching for digital images associated with the particular calendar entry.

43. The system of claim 16, further comprising:

means for presenting a link with the selected calendar entry, the link being configured to return any digital images associated with the selected calendar entry.

44. The system of claim 16, wherein the selected calendar entry further includes a note field, the system further comprising:

means for receiving input specifying a topic; and means for storing the input into the note field.

45. The system of claim 16, further comprising:

means for presenting the selected calendar entry on a display device, the calendar entry being presented in a calendar-centric representation including a presentation of:

the time interval, and the digital image.

* * * * *

UNITED STATES PATENT AND TRADEMARK OFFICE
CERTIFICATE OF CORRECTION

PATENT NO. : 7,636,733 B1
APPLICATION NO. : 10/678606
DATED : December 22, 2009
INVENTOR(S) : Kenneth Rothmuller Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 564 days.

Signed and Sealed this

Ninth Day of November, 2010

David J. Kappos
*Director of the United States Patent and Trademark Office*